United States Patent
Yoshida et al.

(10) Patent No.: US 11,828,246 B2
(45) Date of Patent: Nov. 28, 2023

(54) INTERNAL COMBUSTION ENGINE SYSTEM

(71) Applicant: TOYOTA JIDOSHA KABUSHIKI KAISHA, Aichi-ken (JP)

(72) Inventors: Takahiro Yoshida, Nagoya (JP); Takehiro Komatsu, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 14 days.

(21) Appl. No.: 17/963,136

(22) Filed: Oct. 10, 2022

(65) Prior Publication Data

US 2023/0184191 A1   Jun. 15, 2023

(30) Foreign Application Priority Data

Dec. 13, 2021   (JP) .................. 2021-201524

(51) Int. Cl.
*F02D 41/40* (2006.01)
*F02D 41/06* (2006.01)

(52) U.S. Cl.
CPC ......... *F02D 41/402* (2013.01); *F02D 41/065* (2013.01); *F02D 2200/021* (2013.01); *F02D 2200/1002* (2013.01); *F02D 2250/31* (2013.01)

(58) Field of Classification Search
CPC .............. F02D 41/402; F02D 41/065; F02D 2200/021; F02D 2200/1002; F02D 2250/31

See application file for complete search history.

(56) References Cited

U.S. PATENT DOCUMENTS

| | | | |
|---|---|---|---|
| 2005/0060086 A1* | 3/2005 | Abe ................... | F02M 51/0664 701/103 |
| 2005/0193983 A1* | 9/2005 | Ohtani ............... | F02D 41/3836 123/294 |
| 2009/0037085 A1* | 2/2009 | Kojima ................ | F02N 99/006 123/179.5 |
| 2011/0137543 A1* | 6/2011 | Gibson ............... | F02D 41/3076 123/299 |
| 2016/0215725 A1* | 7/2016 | Terauchi ............. | F02D 41/182 |
| 2017/0030287 A1* | 2/2017 | Matsunaga .......... | F02D 41/065 |

(Continued)

FOREIGN PATENT DOCUMENTS

| | | |
|---|---|---|
| JP | 2010229995 A | 10/2010 |
| JP | 2011157822 A | 8/2011 |
| JP | 6395025 B2 | 9/2018 |

*Primary Examiner* — Carl C Staubach
(74) *Attorney, Agent, or Firm* — HAUPTMAN HAM, LLP

(57) ABSTRACT

An internal combustion engine system includes an internal combustion engine including an in-cylinder injection valve and a fuel pressure adjustment mechanism, and a control device that executes fuel injection control at a time of automatic restart of the internal combustion engine that is automatically stopped, by controlling the in-cylinder injection valve and the fuel pressure adjustment mechanism, in which the control device includes a first controller that executes the compression stroke injection a first number of times after an automatic restart request is made and control the pressure of the fuel to a predetermined value, and a second controller that executes the intake stroke injection a second number of times after the compression stroke injection is executed the first number of times and make the pressure of the fuel lower than the predetermined value.

6 Claims, 4 Drawing Sheets

(56) References Cited

U.S. PATENT DOCUMENTS

2017/0058819 A1* 3/2017 Nakamura ............ F02D 41/065
2018/0328307 A1* 11/2018 Kurtz ................... F02D 41/403
2020/0157980 A1* 5/2020 Niwa ................. F02M 51/0685

* cited by examiner

INTERNAL COMBUSTION ENGINE SYSTEM

CROSS-REFERENCE TO RELATED APPLICATION

This application claims priority to Japanese Patent Application No. 2021-201524 filed on Dec. 13, 2021, incorporated herein by reference in its entirety.

BACKGROUND

1. Technical Field

The present disclosure relates to an internal combustion engine system.

2. Description of Related Art

An automatic restart may be requested for an internal combustion engine that is automatically stopped. In this case, there is a technique of executing compression stroke injection in which fuel injection is executed in a compression stroke from an in-cylinder injection valve. As a result, a torque of the internal combustion engine can be made larger at an early stage to automatically restart the internal combustion engine. The compression stroke injection is executed in a state in which a pressure of fuel is high to promote fuel atomization (see, for example, Japanese Patent 6395025 (JP 6395025 B)).

SUMMARY

However, even in a case where request torque at a time of an automatic restart request is small, when a pressure of fuel remains high after automatic restart is completed, there is a risk that an actual fuel injection amount is larger than a fuel injection amount requested after the automatic restart is completed. As a result, there is a risk that an air-fuel ratio shifts to a rich side with respect to a stoichiometric air-fuel ratio, and affects exhaust emission or fuel efficiency.

Therefore, the present disclosure is to provide an internal combustion engine system capable of suppressing shifting of an air-fuel ratio to a rich side after automatic restart of an internal combustion engine is completed.

An aspect of the present disclosure relates to an internal combustion engine system including an internal combustion engine and a control device. The internal combustion engine includes an in-cylinder injection valve configured to execute compression stroke injection that is fuel injection in a compression stroke and intake stroke injection that is fuel injection in an intake stroke. The internal combustion engine includes a fuel pressure adjustment mechanism configured to adjust a pressure of fuel supplied to the in-cylinder injection valve. The control device is configured to execute fuel injection control at a time of automatic restart of the internal combustion engine that is automatically stopped, by controlling the in-cylinder injection valve and the fuel pressure adjustment mechanism. The control device includes a first controller configured to execute the compression stroke injection a first number of times after an automatic restart request is made and control the pressure of the fuel to a predetermined value. The control device includes a second controller configured to execute the intake stroke injection a second number of times after the compression stroke injection is executed the first number of times and make the pressure of the fuel lower than the predetermined value.

The internal combustion engine system may further include a pressure accumulation mechanism configured to accumulate the pressure of the fuel supplied to the in-cylinder injection valve, in which the second controller is configured to make the pressure of the fuel lower by executing the intake stroke injection in a state in which fuel supply to the pressure accumulation mechanism is stopped by controlling the fuel pressure adjustment mechanism.

The second controller may be configured to make the second number of times larger as request torque is smaller.

The second controller may be configured to set the second number of times to zero in a case where the request torque is equal to or larger than predetermined torque.

The first and second controllers may be configured to make a total number of times of the first number of times and the second number of times smaller as request torque is larger.

The first and second controllers may be configured to control the pressure of the fuel higher as a temperature of the internal combustion engine is lower.

According to the aspect of the present disclosure, it is possible to provide the internal combustion engine system capable of suppressing shifting of an air-fuel ratio to a rich side after automatic restart of the internal combustion engine is completed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of Hybrid Electric Vehicle

Figure 1:
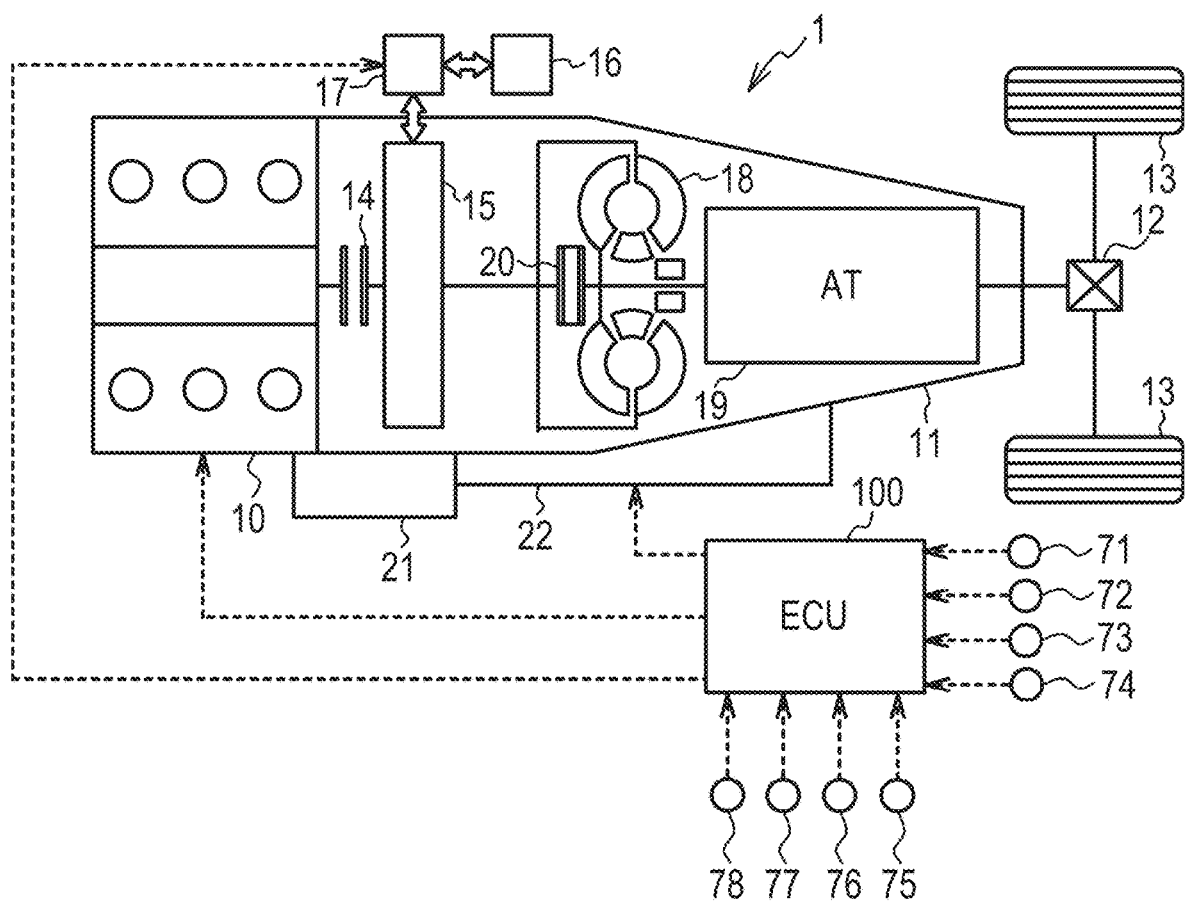
FIG. 1 is a schematic configuration diagram of a hybrid electric vehicle.

FIG. 1 is a schematic configuration diagram of a hybrid electric vehicle 1. In the hybrid electric vehicle 1, a K0 clutch 14, a motor 15, a torque converter 18, and a transmission 19 are sequentially provided in a power transmission path from an engine 10 to driving wheels 13. The engine 10 and the motor 15 are mounted as a traveling drive source for the hybrid electric vehicle 1. The engine 10 is an example of an internal combustion engine, and is, for example, a V-type six-cylinder gasoline engine. However, the number of cylinders is not limited to this, and a series-type gasoline engine may be used. The K0 clutch 14, the motor 15, the torque converter 18, and the transmission 19 are provided in a transmission unit 11. The transmission unit 11 and the right and left driving wheels 13 are drivingly coupled via a differential 12.

The K0 clutch 14 is provided between the engine 10 and the motor 15 on the same power transmission path. The K0 clutch 14 in a released state receives hydraulic pressure supply to be in an engaged state, and connects the power transmission between the engine 10 and the motor 15. The K0 clutch 14 is in the released state when the hydraulic pressure supply is stopped, and cuts off the power transmission between the engine 10 and the motor 15. The engaged state is a state in which both engagement elements of the K0 clutch 14 are coupled and rotation speeds of the engine 10 and the motor 15 are the same. The released state is a state in which both engagement elements of the K0 clutch 14 are separated from each other.

The motor 15 is connected to a battery 16 via an inverter 17. The motor 15 functions as a motor that generates driving force of a vehicle in accordance with power supply from the battery 16, and further functions as a generator that generates electric power to be charged in the battery 16 in accordance with the power transmission from the engine 10 or driving wheels 13. The electric power transferred between the motor 15 and the battery 16 is adjusted by the inverter 17.

The inverter 17 is controlled by an ECU 100 to be described below to convert a direct current voltage from the battery 16 into an alternating current voltage, or to convert the alternating current voltage from the motor 15 into the direct current voltage. In a case of powering operation in which the motor 15 outputs torque, the inverter 17 converts the direct current voltage of the battery 16 into the alternating current voltage to adjust the electric power supplied to the motor 15. In a case of regenerative operation in which the motor 15 generates the electric power, the inverter 17 converts the alternating current voltage from the motor 15 into the direct current voltage to adjust the electric power supplied to the battery 16.

The torque converter 18 is a fluid coupling having a torque amplification function. The transmission 19 is a stepped automatic transmission that switches a gear ratio in multiple stages by switching gear stages, but is not limited to this, and may be a continuously variable automatic transmission. The transmission 19 is provided between the motor 15 and the driving wheels 13 on the power transmission path. The motor 15 and the transmission 19 are coupled via the torque converter 18. The torque converter 18 is provided with a lock-up clutch 20 that receives the hydraulic pressure supply to be in the engaged state, and directly connects the motor 15 and the transmission 19. It should be noted that the torque converter 18 is not always needed and may not be provided.

The transmission unit 11 is further provided with an oil pump 21 and a hydraulic control mechanism 22. The hydraulic pressure generated by the oil pump 21 is supplied to each of the K0 clutch 14, the torque converter 18, the transmission 19, and the lock-up clutch 20 via the hydraulic control mechanism 22. The hydraulic control mechanism 22 is provided with a hydraulic circuit for each of the K0 clutch 14, the torque converter 18, the transmission 19, and the lock-up clutch 20, and various hydraulic control valves for controlling hydraulic pressures thereof.

The hybrid electric vehicle 1 is provided with the electronic control unit (ECU) 100 as a control device for the vehicle. The ECU 100 is an electronic control unit including an arithmetic processing circuit that executes various arithmetic processing related to travel control of the vehicle, and a memory in which a control program or data is stored. The ECU 100 is an example of an internal combustion engine system, and functionally realizes a first controller and a second controller that are described in detail below.

The ECU 100 controls driving of the engine 10 and the motor 15. Specifically, the ECU 100 controls the torque or the rotation speed of the engine 10 by controlling a throttle valve opening degree, an ignition timing, and a fuel injection amount of the engine 10. The ECU 100 controls the torque or the rotation speed of the motor 15 by controlling the inverter 17 to adjust an amount of the electric power transferred between the motor 15 and the battery 16. In addition, the ECU 100 controls driving of the K0 clutch 14, the lock-up clutch 20, or the transmission 19 through the control of the hydraulic control mechanism 22.

Signals from an ignition switch 71, a crank angle sensor 72, a motor rotation speed sensor 73, an accelerator operation amount sensor 74, an air flow meter 75, an air-fuel ratio sensor 76, a coolant temperature sensor 77, and a fuel pressure sensor 78 are input to the ECU 100. The crank angle sensor 72 detects a rotation speed of a crankshaft of the engine 10. The motor rotation speed sensor 73 detects a rotation speed of an output shaft of the motor 15. The accelerator operation amount sensor 74 detects an accelerator operation amount that is an amount of depression of an accelerator pedal by a driver. The air flow meter 75 detects an intake gas amount of the engine 10. The air-fuel ratio sensor 76 detects an air-fuel ratio of exhaust gas flowing into a catalyst 43. The coolant temperature sensor 77 detects a temperature of a coolant of the engine 10. The fuel pressure sensor 78 detects a pressure of the fuel in a high pressure delivery pipe 54 to be described below.

The ECU 100 causes the hybrid electric vehicle to travel in any traveling mode of a motor mode or a hybrid mode. In the motor mode, the ECU 100 releases the K0 clutch 14, and the hybrid electric vehicle travels by the power of the motor 15. In the hybrid mode, the ECU 100 switches the K0 clutch 14 to the engaged state, and the hybrid electric vehicle travels at least by the power of the engine 10. The switching of the traveling mode is executed based on a request driving force of the vehicle obtained from a vehicle speed or an accelerator operation amount, a charge state of the battery 16, and the like.

Schematic Configuration of Engine

Figure 2:
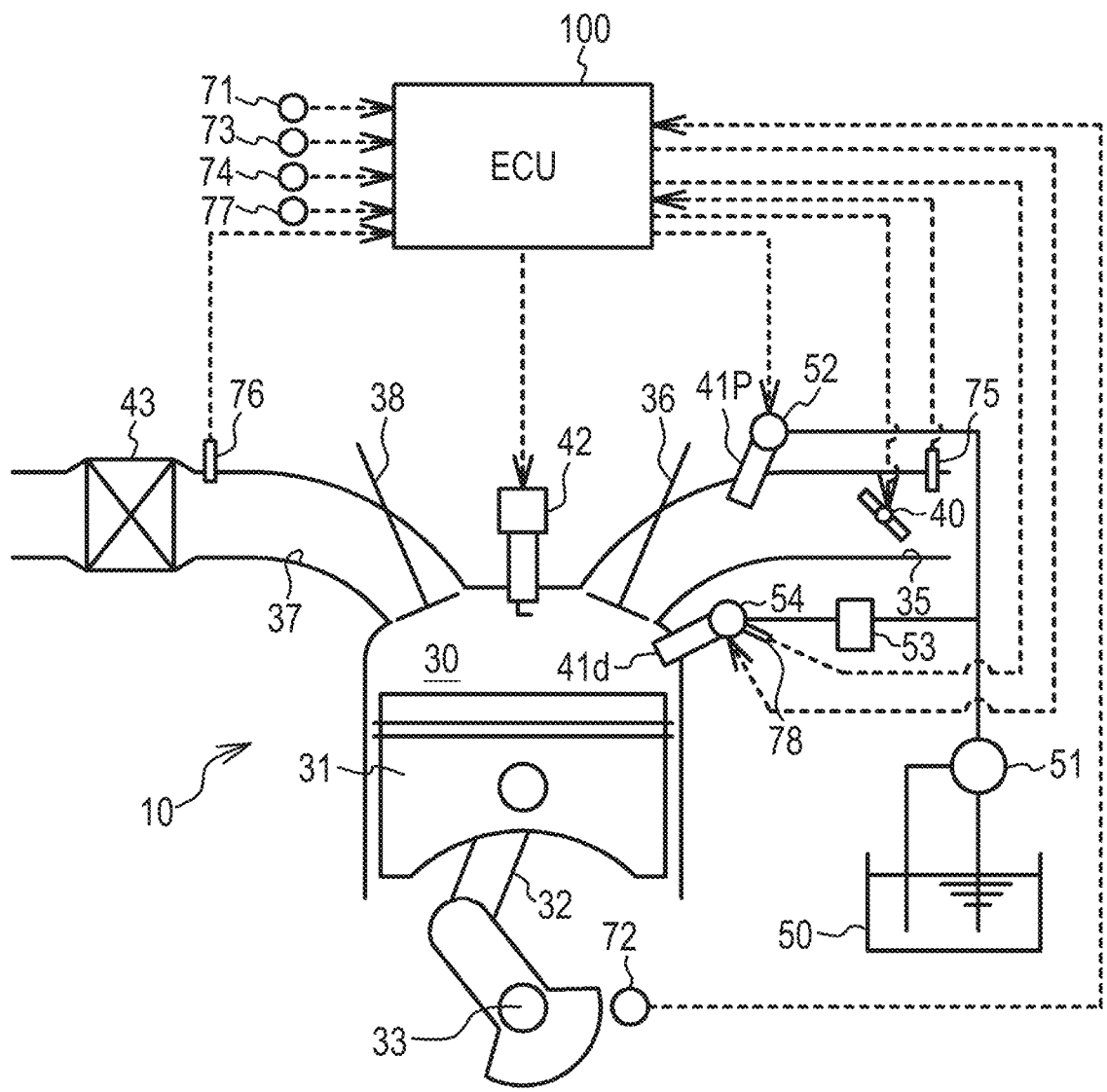
FIG. 2 is a schematic configuration diagram of an engine.

FIG. 2 is a schematic configuration diagram of the engine 10. The engine 10 has a cylinder 30, a piston 31, a connecting rod 32, a crankshaft 33, an intake passage 35, an intake valve 36, an exhaust passage 37, and an exhaust valve 38. In FIG. 2, solely one of a plurality of cylinders 30 included in the engine 10 is displayed. Combustion of an air-fuel mixture is executed in the cylinder 30. The piston 31 is accommodated in each cylinder 30 to allow reciprocation, and is coupled to the crankshaft 33 that is the output shaft of the engine 10 via the connecting rod 32. The connecting rod 32 converts a reciprocating motion of the piston 31 into a rotation motion of the crankshaft 33.

The intake passage 35 is connected to an intake port of each cylinder 30 via the intake valve 36. The exhaust passage 37 is connected to an exhaust port of each cylinder 30 via the exhaust valve 38. The intake passage 35 is provided with the air flow meter 75 and a throttle valve 40 for adjusting the intake gas amount. The exhaust passage 37 is provided with the air-fuel ratio sensor 76 and the catalyst 43 for cleaning the exhaust gas.

An in-cylinder injection valve 41$d$ is provided in the cylinder 30. The in-cylinder injection valve 41$d$ injects the fuel directly into the cylinder 30. The intake passage 35 is provided with a port injection valve 41$p$ for injecting the fuel toward the intake port. It should be noted that, in a case where the in-cylinder injection valve 41$d$ is provided, the port injection valve 41$p$ may not be provided. Each cylinder 30 is provided with an ignition plug 42 that ignites the air-fuel mixture of intake gas introduced through the intake passage 35 and the fuel injected by the in-cylinder injection valve 41*d* and the port injection valve 41*p* by spark discharge.

The port injection valve 41*p* is connected to a low pressure delivery pipe 52. The low pressure delivery pipe 52 is supplied with the fuel in a fuel tank 50 pumped up by a low pressure pump 51. Since the fuel pressure in the low pressure delivery pipe 52 is maintained at a relatively low fuel pressure, the port injection valve 41*p* injects the fuel with a relatively small injection amount. The low pressure pump 51 is an electric pump driven by the supply of the electric power.

The in-cylinder injection valve 41*d* is connected to the high pressure delivery pipe 54. In the high pressure delivery pipe 54, a high pressure pump 53 increases the pressure of the fuel pumped up from the fuel tank 50 by the low pressure pump 51 to accumulate the fuel having a high fuel pressure. Since the inside of the high pressure delivery pipe 54 is maintained at a relatively high fuel pressure, the in-cylinder injection valve 41*d* injects the fuel with a relatively large injection amount. The high pressure pump 53 is a mechanical pump driven in conjunction with the rotation of the engine 10. The fuel pressure sensor 78 is attached to the high pressure delivery pipe 54. The pressure of the fuel (hereinafter, referred to as fuel pressure) detected by the fuel pressure sensor 78 is the fuel pressure in the high pressure delivery pipe 54 as described above, and is also the fuel pressure supplied to the in-cylinder injection valve 41*d*. In addition, the low pressure pump 51 and the high pressure pump 53 are examples of a fuel pressure adjustment mechanism that adjusts the pressure of the fuel supplied to the in-cylinder injection valve 41*d*. The high pressure delivery pipe 54 is an example of a pressure accumulation mechanism.

Automatic Stop and Automatic Restart of Engine

For the engine 10 configured in this way, the ECU 100 executes intermittence operation control of automatically stopping the engine 10 in a case where a predetermined automatic stop condition is satisfied in the hybrid mode, and automatically restarting the engine 10 in a case where a predetermined automatic restart condition is satisfied. The automatic stop condition is, for example, a case where the accelerator operation amount is zero in the hybrid mode. The automatic restart condition is, for example, a case where the accelerator operation amount is larger than zero and the request torque to the engine 10 is larger than zero after the automatic stop of the engine 10.

At the time of the automatic stop, the ECU 100 releases the K0 clutch 14 to stop the fuel injection, and stores the cylinder 30 in which the piston 31 is stopped in the compression stroke, based on an crank angle at a point in time when the rotation of the engine 10 is stopped. At the time of the automatic restart, the ECU 100 controls the K0 clutch 14 to be in a slip state, starts cranking the engine 10 by the motor 15, and starts the fuel injection from the in-cylinder injection valve 41*d* of the cylinder 30 in which the piston 31 is stopped in the compression stroke. In addition, when the fuel injection is executed a predetermined number of times, it is considered that an operating state of the engine 10 is stable, and the automatic restart of the engine 10 is completed. In a case where the automatic restart is completed, the ECU 100 controls the operation such that the K0 clutch 14 is engaged and the torque of the engine 10 is the request torque. It should be noted that, in a case where the engine 10 is provided with a starter motor, the engine 10 may be cranked by the starter motor instead of the motor 15.

Fuel Injection Control with Automatic Restart

Figure 3:
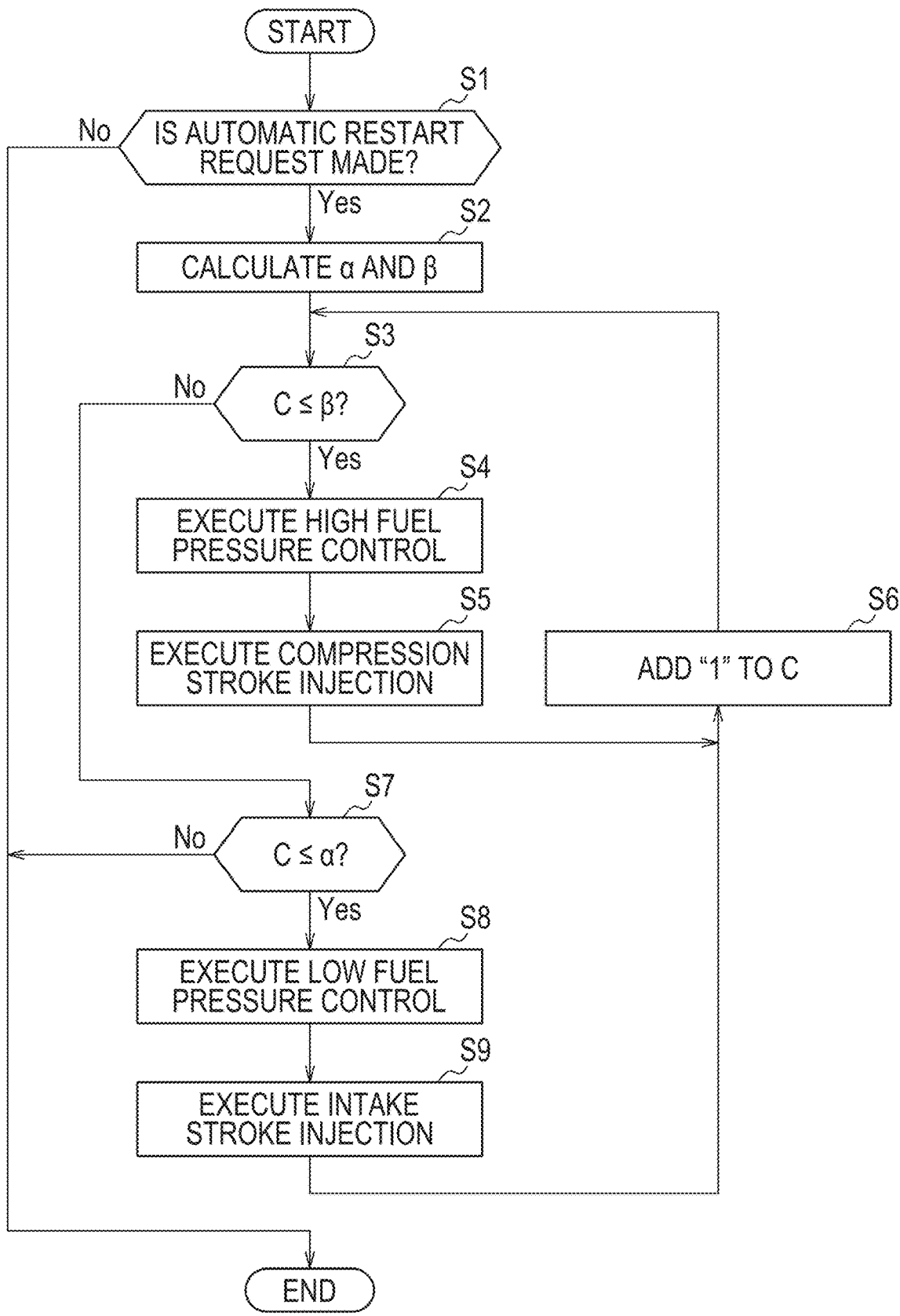
FIG. 3 is a flowchart showing an example of fuel injection control at a time of automatic restart executed by an ECU.

FIG. 3 is a flowchart showing an example of the fuel injection control at the time of the automatic restart executed by the ECU 100. In this control, the ignition is repeatedly executed at predetermined intervals in a state in which the ignition is turned on. The ECU 100 determines whether or not an automatic restart request is made to the engine 10 (step S1). In a case of No in step S1, this control ends.

In a case of Yes in step S1, the ECU 100 calculates a target total number of times $\alpha$ and the number of times of compression stroke injection $\beta$ based on the request torque to the engine 10 when the automatic restart request is made (step S2). The request torque is calculated based on the accelerator operation amount detected by the accelerator operation amount sensor 74, and larger request torque is calculated as the accelerator operation amount is larger.

The target total number of times $\alpha$ is a total number of times the fuel injection is executed from the request for the automatic restart to the completion of the automatic restart. For example, in a four-cylinder engine, the fuel injection is executed in any cylinder every 180 degrees of the crank angle. The fuel injection is executed in any cylinder every 120 degrees of the crank angle in a six-cylinder engine, and is executed in any cylinder every 90 degrees of the crank angle in an eight-cylinder engine. In a case where the engine 10 is the six-cylinder engine as in the present embodiment and $\alpha$=24, for example, the fuel injection control at the time of the automatic restart continues until the crankshaft 33 rotates by 2880 degrees of the crank angle corresponding to 24 times.

The number of times of compression stroke injection $\beta$ is a target number of times of the compression stroke injection that is the fuel injection in the compression stroke out of the target total number of times $\alpha$. The number of times of intake stroke injection $\gamma$ is a target number of times of the intake stroke injection that is the fuel injection in the intake stroke out of the target total number of times $\alpha$. Since a relationship $\alpha=\beta+\gamma$ is satisfied here, the number of times of intake stroke injection $\gamma$ is inevitably calculated by calculating solely the target total number of times $\alpha$ and the number of times of compression stroke injection $\beta$ as in step S2.

In the fuel injection control with the automatic restart, the compression stroke injection is executed for the number of times of compression stroke injection $\beta$, and then the intake stroke injection is executed for the number of times of intake stroke injection $\gamma$. For example, in a case where the engine 10 is the six-cylinder engine as in the present embodiment and $\alpha$=24 and $\beta=\gamma=12$, the compression stroke injection is executed for a period corresponding to 1440 degrees of the crank angle in the first half, and the intake stroke injection is executed for a period corresponding to 1440 degrees of the crank angle in the second half. The number of times of compression stroke injection $\beta$ corresponds to a first number of times, and the number of times of intake stroke injection $\gamma$ corresponds to a second number of times.

Figure 4A:
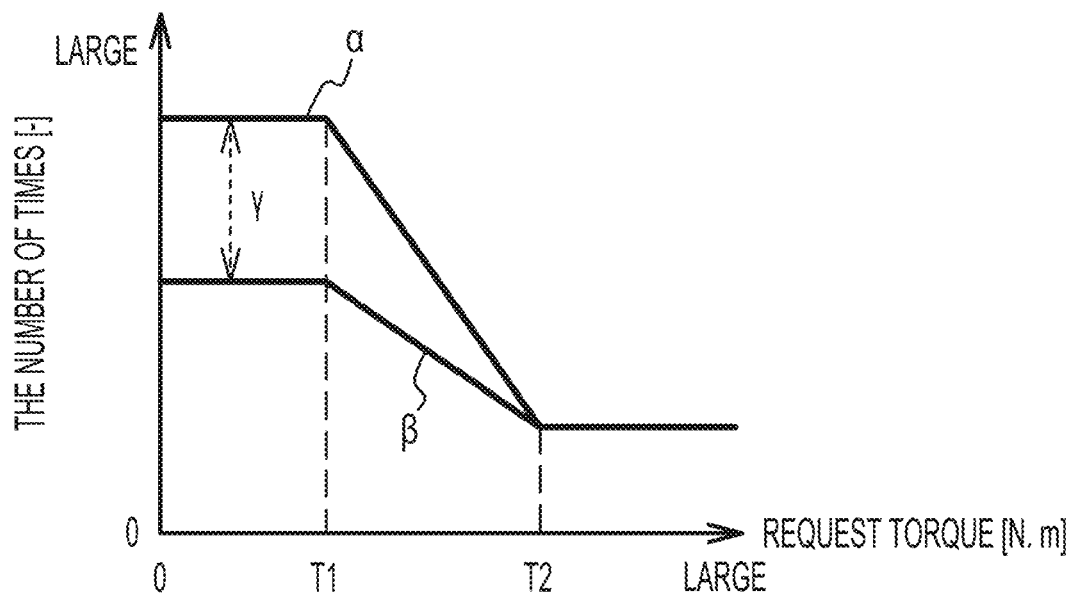
FIG. 4A is an example of a map that defines a relationship between request torque to the engine at the time of automatic restart, a target total number of times α, the number of times of compression stroke injection β, and the number of times of intake stroke injection γ.

FIG. 4A is an example of a map that defines a relationship between the request torque to the engine 10 at the time of the automatic restart, the target total number of times $\alpha$, the number of times of compression stroke injection $\beta$, and the number of times of intake stroke injection $\gamma$. A vertical axis indicates the number of times [-], and a horizontal axis indicates the request torque [N·m]. The target total number of times $\alpha$, the number of times of compression stroke injection $\beta$, and the number of times of intake stroke injection $\gamma$ differ depending on the request torque to the engine 10 at the time of the automatic restart. As shown in FIG. 4A, the number of times of intake stroke injection $\gamma$ can be represented as a difference between the target total number of times α and the number of times of compression stroke injection β.

The target total number of times α, the number of times of compression stroke injection β, and the number of times of intake stroke injection γ are fixed values when the request torque is torque T1, and are all set to the maximum number of times of injection. When the request torque is from the torque T1 to torque T2, the target total number of times α, the number of times of compression stroke injection β, and the number of times of intake stroke injection γ are gradually made smaller. When the request torque is larger than the torque T2, the number of times of intake stroke injection γ is set to zero, and the target total number of times α and the number of times of compression stroke injection β coincide with each other. It should be noted that the target total number of times α, the number of times of compression stroke injection β, and the number of times of intake stroke injection γ are not limited to be calculated based on such a map, and may be calculated by, for example, an arithmetic formula.

Then, the ECU 100 determines whether or not a counter value C for counting the number of times the fuel injection is executed in the engine 10 after the automatic restart request is made is equal to or smaller than the number of times of compression stroke injection β (step S3). It should be noted that, before the fuel injection is executed, the counter value C is set to "0".

In a case of Yes in step S3, the ECU 100 executes high fuel pressure control (step S4), and executes the compression stroke injection by the in-cylinder injection valve 41d (step S5). The fuel can be concentrated around the ignition plug 42 by the compression stroke injection, and stratified charge combustion can be realized in a short period in the combustion stroke following the compression stroke, so that the torque of the engine 10 can be made larger at an early stage. Steps S4 and S5 are examples of a process executed by a first controller. It should be noted that the ECU 100 controls the K0 clutch 14 to be in the slip state at least before the start of step S4, and starts cranking the engine 10 by the motor 15. Then, since the ECU 100 executes the compression stroke injection, "1" is added to the counter value C (step S6).

Figure 4B:
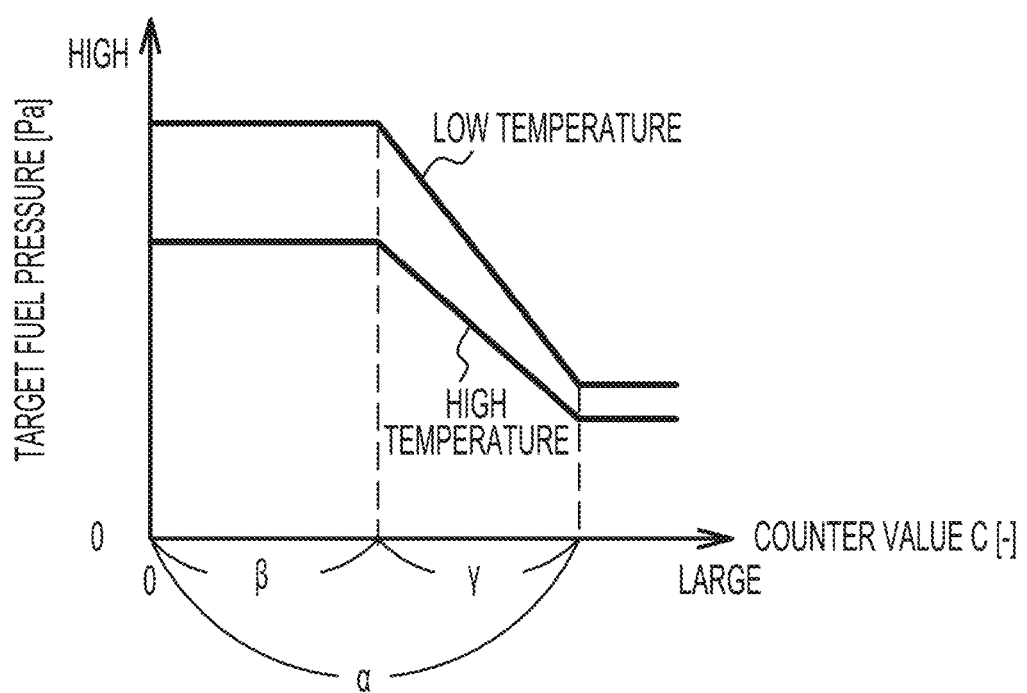
FIG. 4B is an example of a map that defines a relationship between a counter value C and a target fuel pressure at that time.

In the high fuel pressure control in step S4, the ECU 100 maintains the fuel pressure supplied to the in-cylinder injection valve 41d to a high target fuel pressure defined in the map below by controlling the low pressure pump 51 and the high pressure pump 53. FIG. 4B is an example of a map that defines a relationship between a counter value C and a target fuel pressure at that time. A vertical axis indicates the target fuel pressure [Pa], and a horizontal axis indicates the counter value C [-]. This map is stored in the memory of the ECU 100 in advance. As shown in FIG. 4B, the target fuel pressure is set to a high pressure until the counter value C is the number of times of compression stroke injection β. As a result, the fuel injection amount in the compression stroke injection can be secured, and the torque of the engine 10 can be made larger at an early stage. The target fuel pressure in the intake stroke injection will be described below.

As shown in FIG. 4B, in a case where the temperature of the coolant of the engine 10 detected by the coolant temperature sensor 77 is low, the target fuel pressure is set higher than a case where the temperature of the coolant is high. This is because the fuel is less likely atomized as the temperature of the engine 10 is lower, a fuel amount adhering to a bore wall surface of the cylinder 30 is made larger, the fuel amount that contributes to the combustion is insufficient, and the atomization of the fuel can be promoted by setting the target fuel pressure to be high. It should be noted that FIG. 4B shows solely two cases, one is a case where the temperature of the coolant is low and the other is a case where the temperature of the coolant is high. However, actually, the target fuel pressure is defined for each temperature of the coolant, and the target fuel pressure is set to be higher as the temperature of the coolant is lower. The temperature of the coolant is an example of the temperature of the engine 10, and a temperature of lubricating oil may be used instead of the temperature of the coolant.

Then, the ECU 100 executes the process of step S3 again. In a case of No in step S3, the ECU 100 determines whether or not the counter value C is equal to or smaller than the target total number of times α (step S7). In a case of Yes in step S7, the ECU 100 executes low fuel pressure control (step S8), and executes the intake stroke injection (step S9). Homogeneous combustion can be realized by the intake stroke injection, and the torque and the rotation speed of the engine 10 can be stabilized. Steps S8 and S9 are examples of a process executed by a second controller.

In the low fuel pressure control in step S8, the ECU 100 executes the intake stroke injection while stopping the high pressure pump 53 to restrict the supply of new fuel into the high pressure delivery pipe 54. As a result, the fuel in the high pressure delivery pipe 54 is consumed each time the intake stroke injection is executed, and the fuel pressure supplied to the in-cylinder injection valve 41d is gradually made lower. Specifically, as shown in the map of FIG. 4B, the counter value C is equal to or larger than the number of times of compression stroke injection β and equal to or smaller than the target total number of times α, the target fuel pressure is gradually made lower. Step S8 is an example of a process executed by a fuel pressure controller.

Then, since the ECU 100 executes the intake stroke injection, "1" is added to the counter value C (step S6), and the ECU 100 determines again in step S3 as No, and the ECU 100 executes the process of step S7. In a case of No in step S7, this control ends.

As described above, the fuel pressure is made lower by executing the intake stroke injection before the automatic restart is completed. As a result, it is possible to suppress shifting of the air-fuel ratio to the rich side due to the increase in the actual fuel injection amount with respect to the fuel injection amount requested after the automatic restart is completed.

In addition, as shown in FIG. 4A, the number of times of intake stroke injection γ of the intake stroke injection is set to be larger as the request torque is smaller as shown in FIG. 4A, and the fuel pressure is made lower before the automatic restart is completed. Since the fuel injection amount requested after the automatic restart is completed is smaller as the request torque is smaller, the actual fuel injection amount can be made to correspond to the requested fuel injection amount after the automatic restart is completed, by making the fuel pressure sufficiently lower in this case.

In addition, as shown in FIG. 4A, in a case where the request torque is larger than the torque T2, the number of times of intake stroke injection γ is set to zero. As described above, since the fuel injection amount requested after the automatic restart is completed is larger as the request torque is larger, it is possible to secure the fuel injection amount after the automatic restart is completed, by maintaining the fuel pressure high by not executing the intake stroke injection described above. Therefore, the torque T2 in a case where the number of times of intake stroke injection γ is set to zero is set to the minimum value of the request torque in which the target fuel pressure after the automatic restart is completed is equal to or larger than the target fuel pressure of the compression stroke injection. The torque T2 is an example of a predetermined torque.

As shown in FIG. 4A, the target total number of times a is smaller as the request torque is larger. This is because, since a longer time is needed to increase the actual torque of the engine 10 to the request torque as the request torque is larger, the automatic restart is completed at an early stage and the operation proceeds to normal operation to control the fuel injection amount, the throttle valve opening degree, and the ignition timing in accordance with the request torque.

In the embodiment described above, the case where the hybrid electric vehicle is controlled by a single ECU 100 has been described, but the present disclosure is not limited to this. For example, the control described above may be executed by a plurality of ECUs, such as an engine ECU that controls the engine 10, a motor ECU that controls the motor 15, and a clutch ECU that controls the K0 clutch 14.

In the embodiment described above, the hybrid electric vehicle 1 in which the K0 clutch 14 is provided between the engine 10 and the motor 15 has been described, but the present disclosure is not limited to this. For example, the vehicle may be a hybrid electric vehicle in which an engine and a first motor are connected to a driving shaft coupled to driving wheels via a planetary gear, and a second motor is connected to the driving shaft. In addition, the vehicle is not limited to the hybrid electric vehicle 1 and may be an engine vehicle. In a case of the engine vehicle, the automatic stop and the automatic restart of the engine are executed by a so-called stop-start function.

Although the embodiment of the present disclosure has been described in detail above, the present disclosure is not limited to such a specific embodiment, and various modifications and changes can be made within the scope of the gist of the present disclosure described in the claims.

The invention claimed is:

1. An internal combustion engine system, comprising:
    an internal combustion engine including
        an in-cylinder injection valve configured to execute compression stroke injection that is fuel injection in a compression stroke and intake stroke injection that is fuel injection in an intake stroke, and
        a fuel pressure adjustment mechanism configured to adjust a pressure of fuel supplied to the in-cylinder injection valve; and
    a control device configured to execute fuel injection control at a time of automatic restart of the internal combustion engine that is automatically stopped, by controlling the in-cylinder injection valve and the fuel pressure adjustment mechanism,
    wherein
    the control device is configured to determine a counter value indicating a number of times of the fuel injection executed in the internal combustion engine after a request for the automatic restart is made, and
    the control device includes
        a first controller configured to, in response to the counter value being equal to or smaller than a first target number of times of the compression stroke injection, execute the compression stroke injection and control the pressure of the fuel to a predetermined value, and
        a second controller configured to, in response to the counter value being equal to or smaller than a target total number of times of the fuel injection executed from the request for the automatic restart to a completion of the automatic restart, execute the intake stroke injection and make the pressure of the fuel lower than the predetermined value, the target total number of times being a sum of the first target number of times of the compression stroke injection and a second target number of times of the intake stroke injection.

2. The internal combustion engine system according to claim 1, further comprising a pressure accumulation mechanism configured to accumulate fuel supplied to the in-cylinder injection valve,
    wherein the second controller is configured to make the pressure of the fuel lower by executing the intake stroke injection in a state in which fuel supply to the pressure accumulation mechanism is stopped by controlling the fuel pressure adjustment mechanism.

3. The internal combustion engine system according to claim 2, wherein the second controller is configured to make the second target number of times of the intake stroke injection larger as request torque is smaller.

4. The internal combustion engine system according to claim 3, wherein the second controller is configured to set the second target number of times of the intake stroke injection to zero in a case where the request torque is equal to or larger than predetermined torque.

5. The internal combustion engine system according to claim 1, wherein the first and second controllers are configured to make the target total number of times of the fuel injection smaller as request torque is larger.

6. The internal combustion engine system according to claim 1, wherein the first and second controllers are configured to control the pressure of the fuel higher as a temperature of the internal combustion engine is lower.

* * * * *